(12) United States Patent
Bibikar et al.

(10) Patent No.: US 9,471,132 B2
(45) Date of Patent: Oct. 18, 2016

(54) TECHNIQUES FOR PUTTING PLATFORM SUBSYSTEMS INTO A LOWER POWER STATE IN PARALLEL

(71) Applicant: Intel Corporation, Santa Clara, CA (US)

(72) Inventors: Vasudev Bibikar, Austin, TX (US); Rajith K. Mavila, Austin, TX (US)

(73) Assignee: INTEL CORPORATION, Santa Clara, CA (US)

( * ) Notice: Subject to any disclaimer, the term of this patent is extended or adjusted under 35 U.S.C. 154(b) by 256 days.

(21) Appl. No.: 14/040,156

(22) Filed: Sep. 27, 2013

(65) Prior Publication Data

US 2015/0095677 A1    Apr. 2, 2015

(51) Int. Cl.
*G06F 1/26* (2006.01)
*G06F 1/32* (2006.01)

(52) U.S. Cl.
CPC ........... *G06F 1/3234* (2013.01); *G06F 1/3243* (2013.01); *G06F 1/3287* (2013.01); *G06F 1/3203* (2013.01); *Y02B 60/1239* (2013.01); *Y02B 60/1282* (2013.01); *Y02B 60/32* (2013.01)

(58) Field of Classification Search
CPC .................................................... G06F 1/3234
USPC ........................................................ 713/323
See application file for complete search history.

(56) References Cited

U.S. PATENT DOCUMENTS

| | | | | |
|---|---|---|---|---|
| 5,692,197 A * | 11/1997 | Narad et al. | ................... | 713/323 |
| 5,913,068 A * | 6/1999 | Matoba | ......................... | 713/322 |
| 6,665,802 B1 * | 12/2003 | Ober | ............................. | 713/320 |
| 7,869,835 B1 * | 1/2011 | Zu | ......................... | G06F 1/3203 |
| | | | | 455/127.5 |
| 8,549,200 B2 * | 10/2013 | Nakahashi et al. | ........... | 710/261 |
| 2006/0240798 A1 * | 10/2006 | Jarosinski | ............ | H04B 1/1615 |
| | | | | 455/343.1 |
| 2008/0091965 A1 * | 4/2008 | Nychka | ................. | G06F 1/3203 |
| | | | | 713/323 |
| 2008/0276110 A1 * | 11/2008 | Indiani et al. | ................ | 713/330 |
| 2009/0249103 A1 * | 10/2009 | Jeyaseelan et al. | .......... | 713/324 |
| 2010/0205468 A1 | 8/2010 | Kim | | |
| 2010/0281309 A1 * | 11/2010 | Laurenti | ............ | G06F 11/3013 |
| | | | | 714/45 |
| 2011/0258469 A1 | 10/2011 | Guan et al. | | |
| 2012/0113452 A1 * | 5/2012 | Takeshita | ..................... | 358/1.13 |
| 2012/0185703 A1 * | 7/2012 | Machnicki et al. | .......... | 713/300 |
| 2013/0124895 A1 * | 5/2013 | Saha | ........................ | G06F 1/26 |
| | | | | 713/323 |
| 2013/0166869 A1 * | 6/2013 | Wang | ................... | G06F 12/1466 |
| | | | | 711/163 |
| 2013/0268788 A1 * | 10/2013 | Baum et al. | .................. | 713/323 |
| 2014/0189401 A1 * | 7/2014 | Keppel | ................. | G06F 1/3206 |
| | | | | 713/323 |
| 2014/0337650 A1 * | 11/2014 | Madhusudana et al. | ..... | 713/323 |

OTHER PUBLICATIONS

Search Report and Office Action received for Taiwanese Patent Application No. 103132777, mailed Aug. 31, 2015, 7 pages including 1 page English translation.

* cited by examiner

*Primary Examiner* — Thomas Lee
*Assistant Examiner* — Volvick DeRose

(57) ABSTRACT

Various embodiments are generally directed to an apparatus, method and other techniques for determining a sleep configuration state for each of a plurality of subsystems having an associated subsystem sleep control register for entry into a lower power state, configuring each of the associated subsystem sleep control registers with the sleep configuration state for each of the subsystems and enabling the sleep configuration state for each of the subsystems in parallel when transitioning to the lower power state.

17 Claims, 12 Drawing Sheets

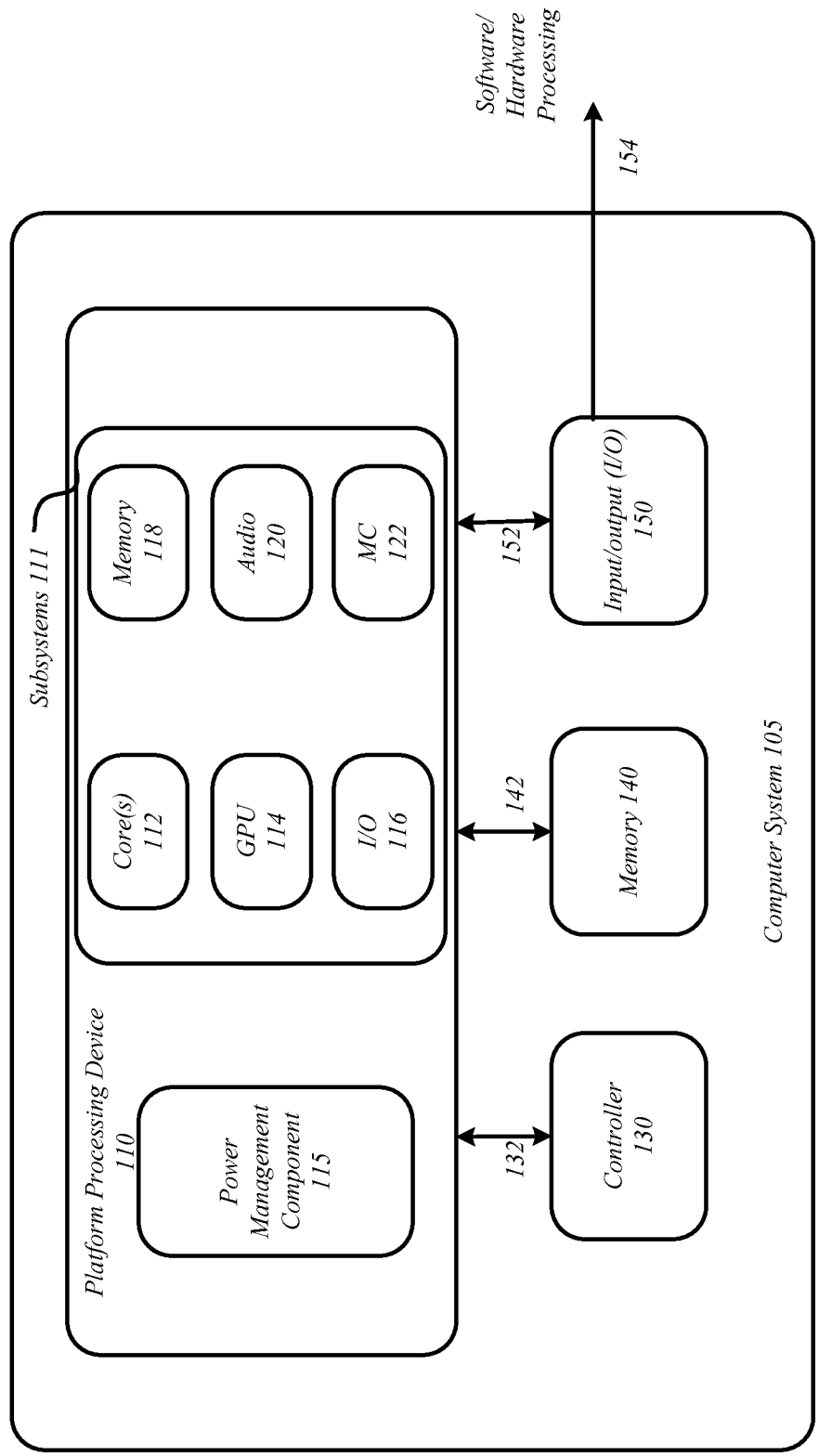

400

```
DETERMINE A SLEEP CONFIGURATION STATE FOR EACH OF A
PLURALITY OF SUBSYSTEMS HAVING AN ASSOCIATED SUBSYSTEM
SLEEP CONTROL REGISTER FOR ENTRY INTO A LOW POWER
STATE
402
```

```
CONFIGURE EACH OF THE ASSOCIATED SUBSYSTEM SLEEP
CONTROL REGISTERS WITH THE SLEEP CONFIGURATION STATE
FOR EACH OF THE SUBSYSTEMS
404
```

```
ENABLE THE SLEEP CONFIGURATION STATE FOR EACH OF THE
SUBSYSTEMS IN PARALLEL WHEN TRANSITIONING TO THE LOW
POWER STATE
406
```

*FIG. 4*

TECHNIQUES FOR PUTTING PLATFORM SUBSYSTEMS INTO A LOWER POWER STATE IN PARALLEL

TECHNICAL FIELD

Embodiments described herein generally relate low power states for computing system. In particular, embodiments are directed to putting subsystems of a platform process device into low power states in parallel.

BACKGROUND

System on a chip (SoC) devices are becoming more prevalent in today's high tech world. SoCs incorporate a large amount of processing functionality with heterogeneous devices on a single semiconductor device. As SoCs become more complicated over time, efficient and low overhead power management becomes more difficult as the number of subsystems expands. The latency to enter and exit low power states is a key parameter effecting power management efficiency of SoCs. The transition time of subsystems going into and out of a low power state effectively gets removed from the residency time of the SoCs in the low power state, thereby resulting in higher power consumption and shorter battery life.

BRIEF DESCRIPTION OF THE DRAWINGS

FIG. 1A illustrates an embodiment of a first system.
FIG. 4 illustrates an embodiment of a third logic flow.

DETAILED DESCRIPTION

Figure 1B:
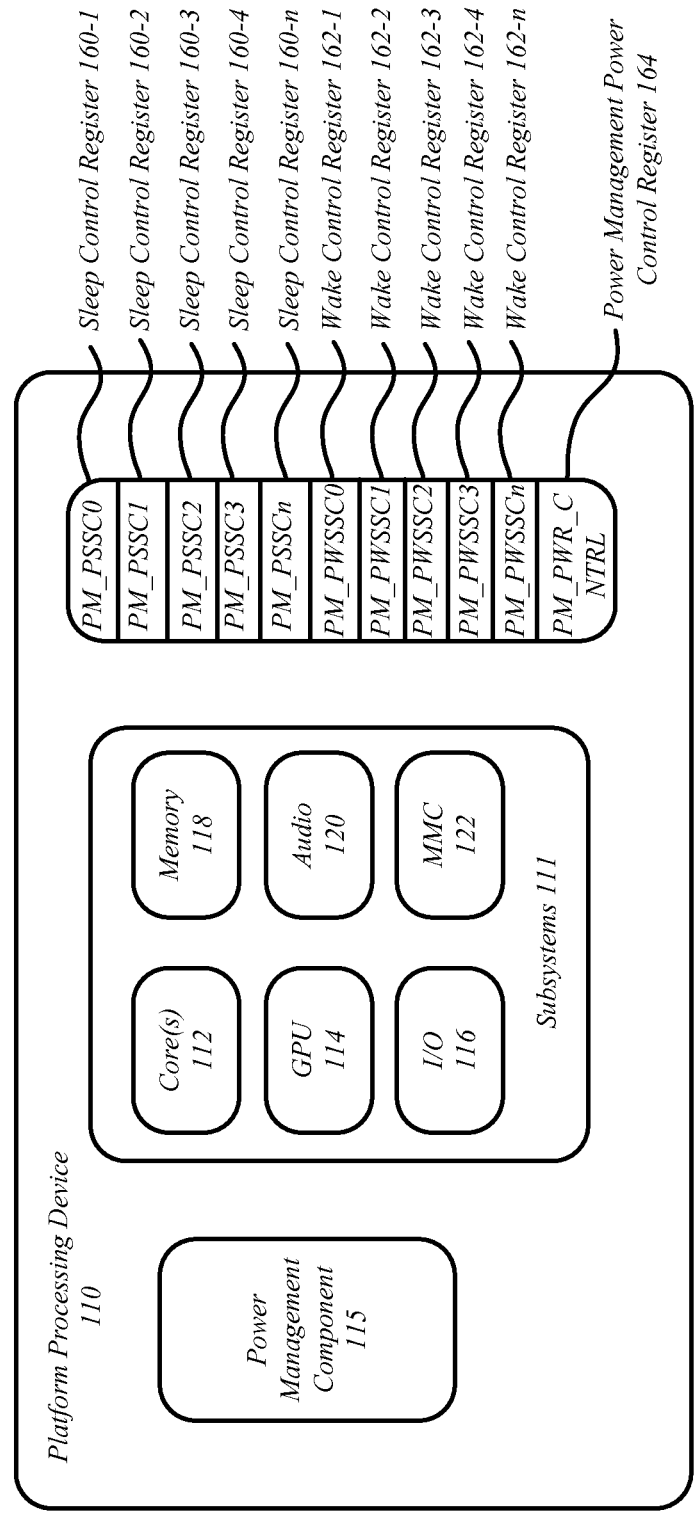
FIG. 1B illustrates an embodiment of a second system.

Various embodiments are generally directed to an apparatus, method and other techniques for transitioning one or more subsystems of a platform processing device into a low or lower power state. Various subsystems may include one or more processing cores, memory controllers, graphic processing unit controllers, audio controllers, input/output (I/O) controllers including media card interface controllers, universal serial bus controllers, serial bus controllers, parallel port controllers, IEEE 1394 Firewire controllers, wireless and wired networking controllers or any other type of controller or system on a platform processing device.

In some embodiments, configuration registers for each of the subsystems may be configured to set various power controls when a subsystem enters or exits a low power state. For example, each subsystem may include a sleep control register containing information for configuring the power controls when the subsystem enters a lower power state. In addition, each subsystem may include a wake control register containing information for configuring the power controls when the subsystem exits a lower power state.

The power controls may include, but are not limited, to a firewall enable power control, a power enable power control, a clock enable power control, and a reset power control. Each subsystem may include registers corresponding to each of the power controls which may be configured based on the configuration registers. Each of the power controls may be configured for each subsystem in parallel. For example, all of the registers corresponding to the firewall enable power control may be configured or set at the same time or in parallel for each subsystem. Each power control may be set or configured in this manner.

In some embodiments, the platform processing device may include a power management component or logic to control when each of the power controls is configured for each of the subsystems of the platform processing device. More specifically, logic may include setting one or more control bits corresponding to each of the power controls to initiate the configuration of each of the power controls for the subsystems in a register, such as a power management power control register.

In some embodiments, when the logic sets one or more control bits corresponding to a power control in the power management power control register, the power control is configured for each of the subsystems in parallel. The logic may set one or more bits corresponding to each of the power controls with a delay between setting the bits. More specifically the logic may set one or more bits corresponding to one of the power controls and then wait a time period or a delay to allow the power control for the subsystems to be configured. The logic may set another bit or bits corresponding to another power control to set or configure for each of the subsystem. This process may be repeated until all of the power controls are configured for the subsystem. By configuring each of the power controls in a parallel, as opposed to serially, significant time may be saved when transitioning into and out of a low power state resulting in an increase in power savings and extending battery life for mobile platform devices.

With general reference to notations and nomenclature used herein, the detailed description that follows may be presented in terms of program procedures executed on a computer or network of computers. These procedural descriptions and representations are used by those skilled in the art to most effectively convey the substance of their work to others skilled in the art.

A procedure is here and is generally conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein that form part of one or more embodiments. Rather, the operations are machine operations. Useful machines for performing operations of various embodiments include general-purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an embodiment of an exemplary computer system 105 suitable for implementing various embodiments described herein. In various embodiments, the computer system 105 comprises a platform processing device 110, a controller 130, a memory device 140 and an input/output (I/O) device 150. The platform processing device 110 may be any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The platform processing device 110 may be connected to and communicate with the controller 130, the memory device 140, and the I/O device 150 via interconnects 132, 142 and 152, respectively. Moreover, the controller 130, the memory device 140, and the I/O device 150 may communicate with all of the components of the platform processing device 110.

While not limited in this respect, the platform processing device 110 may comprise a power management component 115, and one or more subsystems 111 including one or more processor components 112, a graphics processing unit (GPU) 114, a platform I/O device 116, a platform memory device 118, an audio controller component 120, a multimedia card controller component 122 and any other uncore (non-core) components (not shown). Uncore components may include other memory, caches, pipelines, I/O devices and controllers. In some embodiments, the platform processing device 110 may have more than two processing cores, for example. The one or more processor components 112 may have more than one processing unit or processing cores. The one or more processor components 112 include, but are not limited to, pre-fetch logic to fetch instructions, decode logic to decode the instructions, execution logic to execute instructions and the like.

In some embodiments, the platform processing device 110 includes a graphics processing unit 114. The graphics processing unit 114 may function as an adjunct processor that manages graphics and/or video operations and/or processing.

The platform processing device 110 includes a platform I/O device 116 and platform memory device 118 in some embodiments. The platform I/O device 116 provides an external interface for the platform processing device 110 to other devices within computer system 105. In addition, the platform memory device 118 stores instructions and/or data of the platform processing device 110, and in particular, the one or more processor components 112. The platform memory device 118 may also store temporary variables or other intermediate information while the platform processing device 110 and the one or more processor components 112 are executing instructions. In another embodiment, the platform memory device 118 includes, but is not limited to, level one (L1), level two (L2) and level three (L3) cache memory or any other configuration of the cache memory within the platform processing device 110. The processor components 112, the graphics processing unit 114, the platform I/O device 116 and platform memory device 118 may communicate with each other via interconnects (not shown).

In addition, the platform processing device 110 may also include an audio controller component 120 and a media card controller component 122. The audio controller component 120 may control audio or audible signals for processing. More specifically, the audio controller component 120 may process audio digital information received from one or more applications and send the processed audio digital information to the one or more speakers for playing. In various embodiments, the media card controller component 122 may control input and output access to a flash memory device such as a multimedia card (MMC) or a secure digital card (SD) or any other memory device.

The power management component 115 may be operative to manage power states of the computing system 105, and in particular, the platform processing device 110 and components. In some embodiments, the power management component 115 may be operative to initiate a transition for the platform processing device 110 to enter a low power state. The low power state can be any Advanced Configuration and Power Interface (ACPI) state or any other appropriate low power state. For example, the low power state may be an idle state such as S0ix. In addition, the power management component 115 may also transition from a low power state into a normal operating state.

In some embodiments, the power management component 115 may receive information or an instruction from software, such as an operating system or any other program, indicating that the platform processing device 110 may enter a low power state or exit a low power state. In one example, an operating system may indicate to the platform processing device 110 and power management component 115 that it may enter the low power state by initiating entry into an intermediate power state such as Mwait C state corresponding to the ACPI C3 state. The ACPI C3 state is generally known as the sleep state and offers improved power savings over the C1 and C2 states. While in the C3 state, all internal clock signals from the processing cores are cut. However, the one or more processing cores caches are maintained. The operating system is responsible for ensuring that the caches maintain coherency.

In various embodiments, the power management component 115 may control various aspects of the subsystems 111 when the platform processing device 110 is transitioning into and out of the low power state. For example, the power management component 115 may configure various power control registers for each of the subsystems 111 based on an associated sleep control register when the platform processing device 115 is transitioning to the low power state and configure the power control registers based on an associated wake control register when the platform processing device 115 is transitioning out of the low power state or into a normal operating state. Each of a subsystems sleep control register and wake control register may be configured or set during boot up of the platform processing device 110 or after the platform processing device has fully booted or loaded, but before initiation of a transition.

In various embodiments the sleep control register and wake control register may be configured based on a configuration file such as a master image profile (MIP) header file or in a basic input/output system (BIOS). The MIP header file or BIOS may include information such as general purpose input/output pin settings, alternate pin multiplexing configuration information, platform processing device specific information, such as pull up/down settings for pins for components, any specific firmware parameters, etc. In various embodiments, the MIP header file may be loaded into firmware from memory and initializes various components of the platform processing device 110.

In addition, the configuration file may have a logical to physical mapping table to map the logical subsystem to the physical subsystem. In various embodiments, the power management component 115 may determine the sleep configuration states (and wake configuration states) at boot up time of the platform processing device 110 or after the platform processing device 110 has already completely booted up by looking up the configuration information in the configuration file.

In various embodiments, the power management component 115 may transition the subsystem into and out of the low power state in a parallel manner. More specifically, the power management component 115 may configure all of the power control registers of the same type for each of the subsystems in parallel. By processing the subsystems entry and exit into or out of the low power state in parallel, the power management component 115 may significantly reduce the amount of time for entry and exit of the low power state. Once each of the subsystems control registers is configured based on the sleep control register or the wake control register, the transition into or out of the low power state for the platform processing device 110 may be complete until another transition is initiated.

FIG. 1B illustrates an embodiment a system 125 including the platform processing device 110. In FIG. 1B, the platform processing device 110 is illustrated with various components including the power management component 115 and subsystems 111 along with registers for controlling the subsystems during entry and exit of a low power state.

In some embodiments, the platform processing device 110 may include sleep control registers 160-1 through 160-n, wake control registers 162-1 through 162-n, and power management power control register 164. As previously discussed, each of the subsystems may be associated with a sleep control register 160 and a wake control register 162. For example, GPU 114 may be associated with sleep control register 160-1 and wake control register 162-1 and audio controller component 120 may be associated with sleep control register 160-2 and wake control register 162-2. The other subsystems of the platform processing device 110 may be associated with different sleep control registers and wake control registers where each subsystem is associated with its own registers.

In various embodiments, each sleep control register 160-1 through 160-n and wake control register 162-1 through 160-n may include two bits for configuring the power control registers for each of the subsystems. Logic table 1 illustrates one example of the control logic for the power control registers for the subsystems.

TABLE 1

| PM_PSSCn/PM_PWSSCn Register States | Firewall Enable | Power Enable | Clock Enable | Reset |
| --- | --- | --- | --- | --- |
| 00 | 1 | 0 | 1 | 1 |
| 01 | 1 | 0 | 0 | 1 |
| 10 | 0 | 1 | 0 | 0 |
| 11 | 0 | 1 | 0 | 0 |

As illustrated in Table 1, each of the sleep control and wake control register states corresponds with power control states for the power control registers for each of the subsystems. The "00" register state indicates that the subsystem and corresponding power controls are to remain in the normal operating state. In the normal operating state, the firewall enable remains in an open state, the power enable remains in an on state, the clock enable remains in an on state and reset is not set. The "01" register state indicates that the subsystem and corresponding power controls are to disable the clock, but the remaining power controls are to remain in the normal operating state. The "10" and 11" register states indicate that the subsystem and corresponding power controls are put into a low power state. In the low power state, the firewall enable is closed, the power enable is off, the clock enable is off and the reset is set. Various embodiments are not limited to the above illustrated logic and other logic may exist for transitioning into and out of the low power state.

In some embodiments, the firewall enable power control is an "active low" signal and a logical "1" for the firewall enable power control indicates that the firewall enable is to be open and powered off logic signals can enter an active domain and a logical "0" for the firewall enable power control indicates that the firewall enable is to be closed and powered off logical signals cannot enter the active domain.

The power enable power control is also an "active low" and a logical "1" indicates that the power enable is on and power gating is not enabled or not conducting. In addition, a logical "0" indicates that the power enable is off and power gating is enabled or conducting.

In various embodiments, the clock enable power control is an "active high" signal and a logical "1" indicates the clock enable is on and the clock for the subsystem is on. In addition, a logical "0" indicates the clock enable is off and the clock to the subsystem is off.

The reset power control is an "active low" signal. Therefore, a logical "1" indicates that the reset is not set and a logical "0" indicates that the reset is set.

As previously discussed, each subsystem associated sleep control 160 and/or wake control register 162 may be configured with the above register states for transitioning into or out of a low power state. For example, if the sleep control register 160-1 (PM_PSSC0) associated with GPU 114 is configured with "11," the GPU 114 will be powered off or put into a low power state when the platform processing device 110 is put into a low power state. More specifically, the GPU's 114 firewall enable may be off, the power enable may be off, the clock enable may be off and the reset may be set.

In another example, when the sleep control register 160-1 (PM_PSSC1) associated with the audio controller component 120 is configured with the "00" register state, the audio controller will remain in normal operation when platform processing device 110 is in the low power state. More specifically, the firewall enable will remain open, the power will remain on, the clock enable will remain on, and the reset will not be set for the audio controller component 120.

In various embodiments, the sleep control registers and the wake control registers associated with the subsystems may be used as qualifies to allow the power management component 115 to transition the subsystems into and out of the low power state in a parallel manner. More specifically, each of the power controls, including the firewall enable, power enable, clock enable and reset, may be configured or set for all of the subsystems at the same time or in parallel based on the configuration in each of the sleep configuration registers and/or wake configuration registers associated with particular subsystem.

The platform processing device 110 may also include a platform management power control register 164 for asserting or initiating power control states to each of the subsystems in parallel. In particular, the platform management power control register 164 may include a number of control bits associated with the power controls. In one example, the platform management power control register 164 may include four control bits, wherein each bit corresponds to a particular power control. For example, the first bit may correspond to the firewall enable power control, the second bit may correspond to the power enable power control, the third bit may correspond to the clock enable power control and the fourth bit may correspond to the reset power control.

The power management component 115 may assert each of the power controls by writing to the specific bit(s) corresponding to the specific power control. For example, to assert the firewall enable power control, the power management component 115 may write to the specific bit(s) corresponding to the firewall enable power control. Further, when the power management component 115 writes to the specific bit(s) corresponding to the specific power control, each of the subsystems specific power control will be configured in parallel. For example, when the power management component 115 writes to the specific bit(s) corresponding to the firewall enable power control, each of the subsystems firewall enable power controls will be configured in parallel. The firewall enable power control for each of the subsystems will be configured based on the logic in the associated sleep control register when transitioning into a low power state or the logic in the associated wake control register when transitioning out of the low power state.

The power management component 115 may configure each of the power controls in a similar fashion by writing to the corresponding control bit the power management power control register 164. For example, to configure the power enable power control for each of the subsystem, the power management component 115 may write to the specific bit(s) corresponding to the power enable power control in the power management power control register 164. In another example, the power management component 115 may write to a specific bit(s) in the power management power control register 164 corresponding to the clock enable power control to configure the clock enable for each of the subsystems. Finally, the power management component 164 may configure the reset for each of the subsystems by writing to the specific bit(s) in the power control power management register 164.

In various embodiments, the power management component 115 may configure the power controls in a specific order by writing to the specific bit(s) corresponding to the power controls in the power management power control register 164 in a specific order. For example, the power management component 115 may first write to the bit(s) corresponding to the clock enable power control in the power management power control register 164 to configure all of the clock enable power controls for all of the subsystems. The power management component 115 may then write to the specific bit(s) corresponding to the firewall enable power control, power enable power control and the reset power control to configure those power controls for the subsystems. The power management component 115 may wait for a period of time or a delay before each one of the power controls to ensure that all of the subsystems power controls are configured before moving onto the next power control. For each of the power controls, each of the subsystems will be configured at the same time or in parallel. Various embodiments are not limited to the above recited order and the power controls may be configured in any order.

The components illustrated in the computer system 105 and platform processing device 110 are not meant to be limiting and are presented for purposes of illustration. In other embodiments, the configuration of the computer system 105 includes other (more or less) components than shown in FIG. 1A/1B. One of ordinary skill in the relevant art will appreciate that other configurations of the computer system 105 can be used without affecting the workings of the embodiments described herein.

Figure 1C:
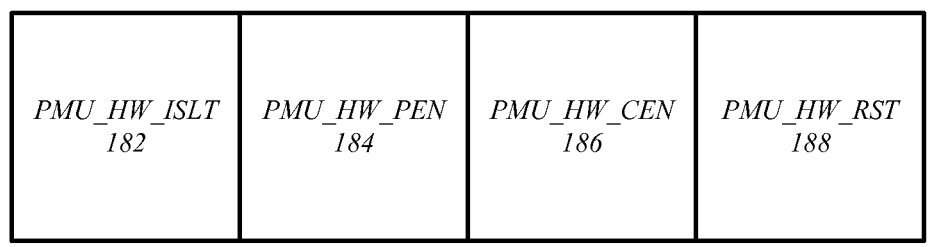
FIG. 1C illustrates an embodiment of power control registers.

FIG. 1C illustrates one embodiment of power control registers 180 for a subsystem. Each subsystem may have a corresponding power control registers 180 to configure when entering or exiting a low power state. The power control registers 180 may include a hardware isolation power control register 182, a power enable power control register 184, a clock enable power control register 186 and a reset power control register 188. Each of the power control registers may be utilized to configure subsystem power controls including the firewall enable power control, the power enable power control, clock enable power control, reset power control. In various embodiments, the hardware isolation power control register 182 may be set to configure the firewall enable power control, the power enable power control register 184 may be set to configure the power enable power control, the clock enable power control register 186 may be set to configure the clock enable power control, the reset power control register 188 may be set to configure the reset power control.

In various embodiments, each of the power control registers 180 for each of the subsystems may be configured based on the sleep control register 160 when entering a low power state and may be based on the wake control register 162 when exiting the low power state. More specifically, the power controls for each of the subsystem may be configured, as shown in Table 1, based on the logic in the corresponding sleep control register 160 and/or wake control register 162. In one example, when the sleep control register 160-1 (PM_PSSC1) associated with the audio controller component 120 is configured with the "11" register state, the power control registers 180 for the audio controller component 120 will be configured as shown in Table 1. In particular, the hardware isolation power control register 182 will be set to off or "0," the power enable power control register 184 will be set to off or "1", the clock enable power control register 186 will be set to off or "0" and the reset power control register 188 will be set on or to "1" for the audio controller component 120 power control registers 180. Each of the subsystems may be configured in a similar manner based on the associated sleep control register 160.

Figure 2A:
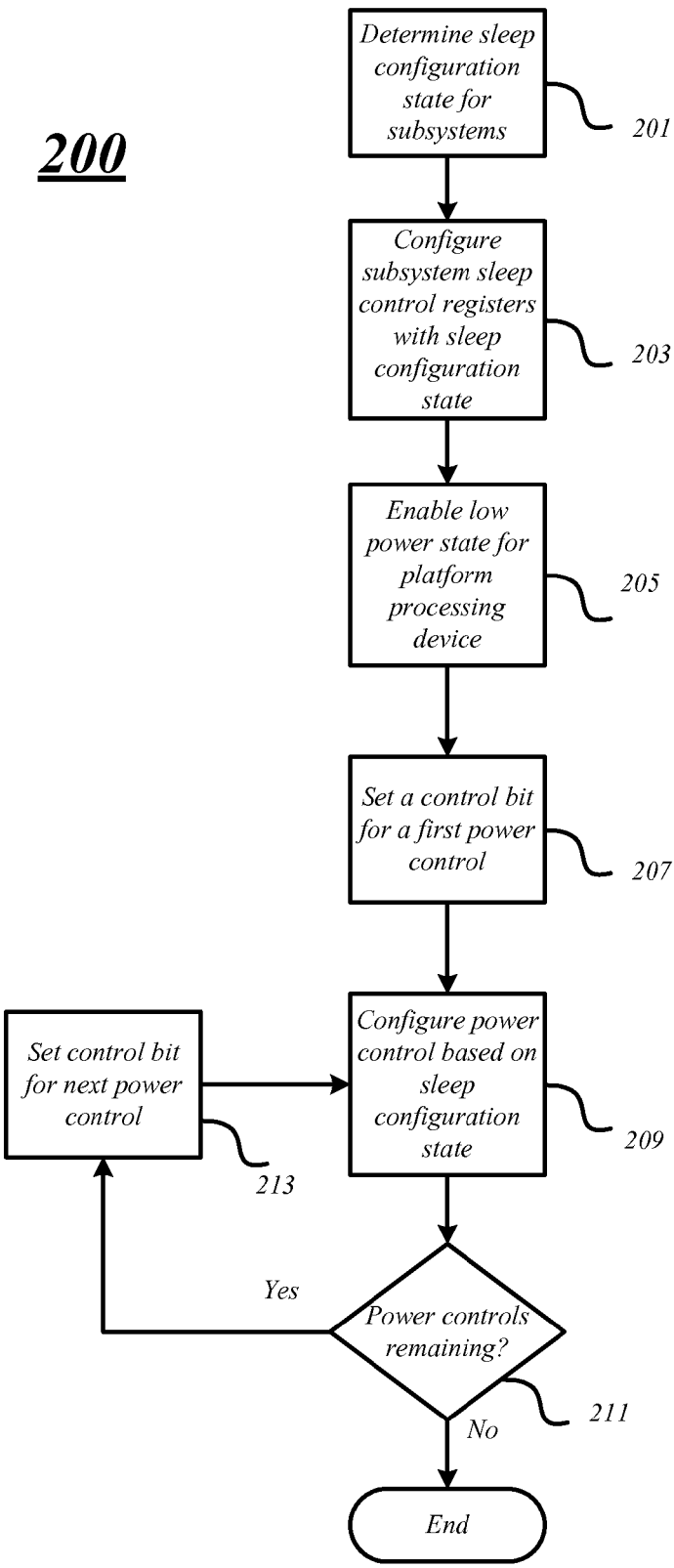
FIG. 2A illustrates an embodiment of a first logic flow for entering a low power state.

FIG. 2A comprises a logic flow diagram 200 illustrating one example of a platform processing device entering a low power state. For clarity purposes, the logic flow is discussed with reference to the computer system 105 of FIG. 1A and platform processing device 110 of FIG. 1A and FIG. 1B. At block 201, the power management component 115 may determine sleep configuration states for each of the subsystems 111 based on a configuration file such as a MIP header file. The configuration file may have a logical to physical mapping table to map the logical subsystem to the physical subsystem. In various embodiments, the power management component 115 may determine the sleep configuration states at boot up time of the platform processing device 110 or after the platform processing device 110 has already completely booted up by looking up the configuration information in the configuration file.

In various embodiments, at block 203 the power management component 115 may configure the sleep control registers 160 for each of the subsystems with the sleep configuration information determined at block 201. The power management component 115 may load or set each of the sleep control registers 160 with the configuration information corresponding to each subsystem. The configuration information may be loaded into or set in the sleep control registers 160 prior the platform processing device 110 entering the low power state.

At block 205, the power management component 115 may enable or initiate entry into a low power state. For example, the power management component 115 may receive information or an instruction from software, such as an operating system or any other program, or hardware such as an interrupt indicating that the platform processing device 110 may enter a low power state. Based on the received information, the power management component 115 may enable entry into the low power state.

In various embodiments, the power management component 115 may set a first bit(s) to configure a power control in the power management power control register 164 at block 207. For example, the power management 115 may set bit(s) corresponding to the clock enable power control in the power management power control register 164. However, various embodiments are not limited in this manner the power management component 115 may set bit(s) corresponding to any of the power controls, including clock enable power control, firewall enable power control, power enable power control and reset power control at block 207.

At block 209, the power management component 115 may configure the power control register for each of the subsystems corresponding to power control set at block 207. For example, if the bit(s) corresponding to the clock enable power control is set at block 207, the power management component 115 may configure the clock enable power control register 186 for each of the subsystems in parallel at block 209.

At decision block 211, the power management component 115 may determine if any of the other power controls remain to be configured for the subsystems. If no other power controls remain to be configured for the subsystem, logic flow 200 may end. However, if addition power controls remain, the power management component 115 sets the bit(s) in the power management power control register 164 for the next power control at block 213. The power management component 209 may then configure the power control register corresponding to the power control bit set at block 213 for each of the subsystems at block 209. This process may be repeated until all of the power controls are set for each of the subsystems.

Figure 2B:
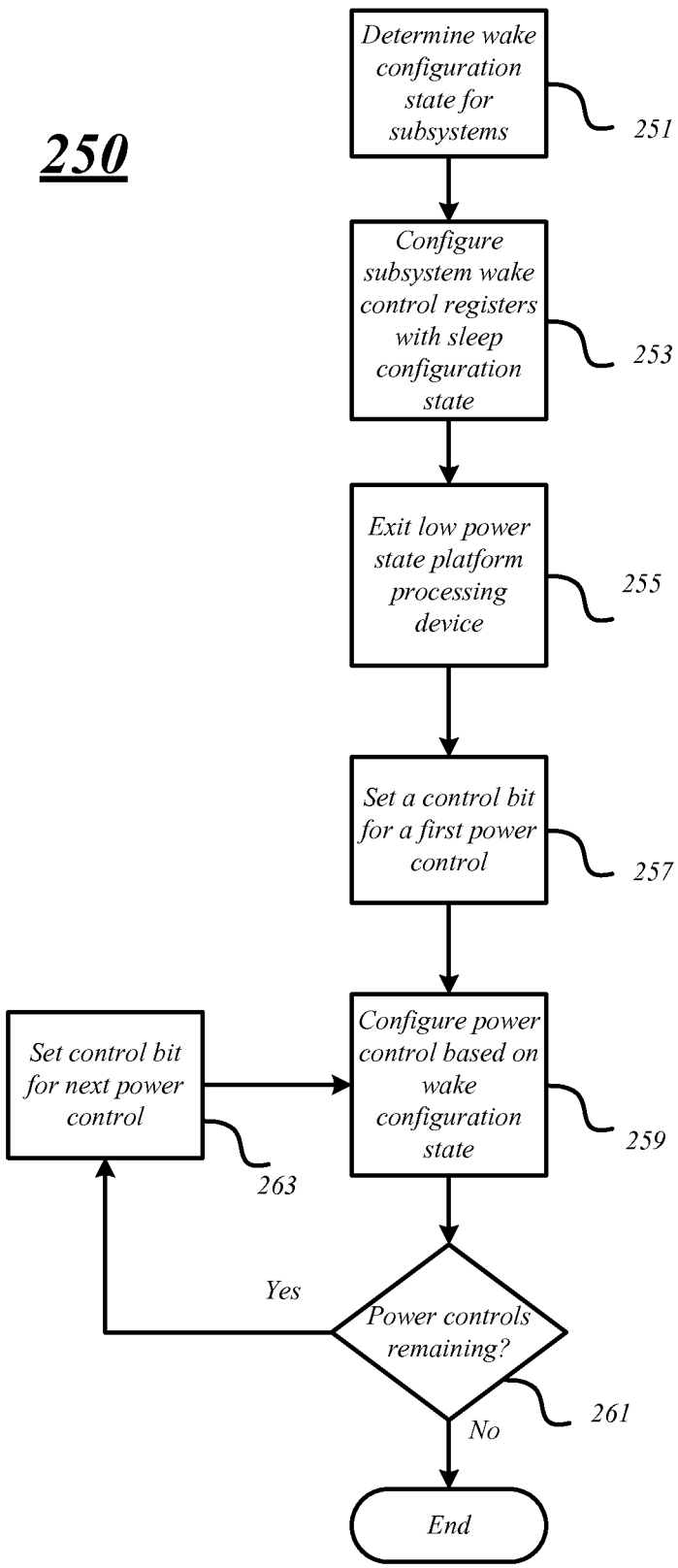
FIG. 2B illustrates an embodiment of a second logic flow for exiting a low power state.

FIG. 2B comprises a logic flow diagram 250 illustrating one example of a platform processing device 110 exiting a low power state. Logic flow 250 may include determining a wake configuration state for each of the subsystems at block 251. As similarly discussed with respect to block 201 of flow diagram 200, the power management component 115 may determine the wake configuration for each of the subsystem based on the configuration file such as the MIP header file. The configuration file may have a logical to physical mapping table to map the logical subsystem to the physical subsystem. In various embodiments, the power management component 115 may determine the wake configuration states at boot up time of the platform processing device 110 or after the platform processing device 110 has already completely booted up by looking up the configuration information in the configuration file.

In various embodiments, at block 253 the power management component 115 may configure the wake control registers 162 for each of the subsystems with the wake configuration information determined at block 203. The power management component 115 may load each of the wake control registers 162 with the configuration information corresponding to each subsystem.

At block 255, the power management component 115 may enable or initiate exiting a low power state. For example, the power management component 115 may receive information or an instruction from software, such as an operating system or any other program, or hardware such as an interrupt indicating that the platform processing device 110 may exit a low power state. Based on the received information, the power management component 115 may exit out of the low power state.

In various embodiments, the power management component 115 may set a first bit(s) to configure a power control in the power management power control register 164 at block 257. For example, the power management 115 may set bit(s) corresponding to the clock enable power control in the power management power control register 164. However, various embodiments are not limited in this manner the power management component 115 may set bit(s) corresponding to any of the power controls, including clock enable power control, firewall enable power control, power enable power control and reset power control at block 257.

At block 259, the power management component 115 may configure the power control register for each of the subsystems corresponding to power control set at block 257. For example, if the bit(s) corresponding to the clock enable power control is set at block 257, the power management component 115 may configure the clock enable power control register 186 for each of the subsystems in parallel at block 259.

At decision block 261, the power management component 115 may determine if any of the other power controls remain to be configured for the subsystems. If no other power controls remain to be configured for the subsystem logic flow 250 may end. However, if addition power controls remain, the power management component 115 sets the bit(s) in the power management power control register 164 for the next power control at block 263. The power management component 259 may then configure the power control register corresponding to the power control bit set at block 253 for each of the subsystems at block 259. Each of the subsystem power controls may be configured based on a corresponding wake control register 162-n. This process may be repeated until all of the power controls are set for each of the subsystems.

Figure 3A:
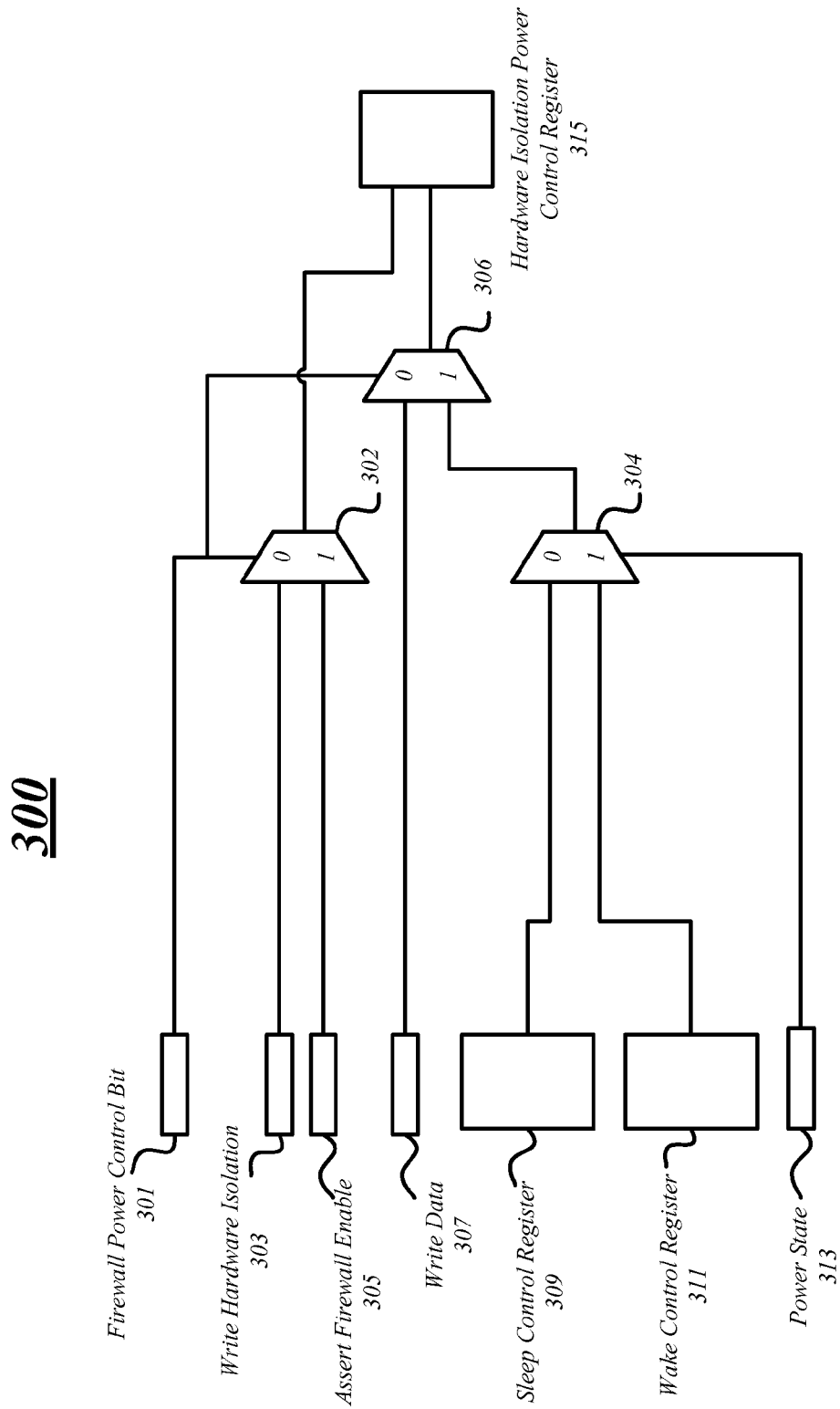
FIG. 3A illustrates an embodiment of a first logic path for firewall enable.

FIG. 3A illustrates an exemplary embodiment of a logic control path 300 for configuring a firewall power control and hardware isolation power control register for a subsystem. Each of the subsystems may have similar or the same logic control path to configure the firewall power control. Various embodiments are not limited to this exemplary embodiment and other logic control paths may be utilized to configure a firewall power control and set a hardware isolation power control register.

The logic control 300 may include a number of input lines including the firewall power control 301, the write hardware isolation 303, the assert firewall enable 305, the write data 307 and the power state 313. In addition, the logic control 300 may include a number of registers such as sleep control register 309, wake control register 311 and hardware isolation power control register 315. Finally, the logic control may include multiplexers 302, 304 and 306 to act as a switch based on one or more of the inputs on the input lines.

In various embodiments, the firewall power control bit(s) 301 may be the control bit(s) in the power management power control register 164 associated with the firewall power control for the subsystems. The firewall power control bit 301 may be the master control bit determining when the information or setting in sleep control register 309 or the wake control register 311 is set in the hardware isolation power control register 315. The firewall power control bit(s) 301 may be asserted or enabled when the power management component 115 writes to the control bit(s) in the power management power control register 164 to configure each firewall enable power control and set the hardware isolation power control register 315 for each subsystem in parallel based on the configuration of the sleep control register 309 or wake control register 311.

In various embodiments, the write hardware isolation 303 and write data 307 are override mechanisms that may be utilized when the firewall power control bit 301 is not enable or set to 0. The write hardware isolation 303 and the write data 307 may be used to isolate any single subsystem for configuration. When the firewall power control bit 301 is set to 0 or not enabled the write hardware isolation 303 is the enable for the hardware isolation power control register 315 and the write data 307 is the information to write to hardware isolation power control register 315. These bits, the hardware isolation 303 and write data 307 are utilized power management component 115 to set the hardware isolation power control register 315 for a single subsystem and not when the subsystems are being set in parallel.

In some embodiments, the sleep control register 309 and wake control register 311 may be the same or similar to sleep control registers 160 and wake control registers 162, respectively. The power state 313 may be set to select between the sleep control register 309 and the wake control register 311. For example, if the platform processing device is not in a low power state, the power state 313 may be set to select the sleep control register 309 to act as a qualifier when the subsystem enters into the low power state. However, if the platform processing device is in a low power state, the power state 313 may be set to select the wake control register 311 to use when the subsystem exits the low power state.

As previously discussed, the sleep control register 309 and wake control register 311 may act as a qualifier and may be used to configure the hardware isolation power control register 315 with the appropriate state for the firewall enable power control. The information in the sleep control register 309 and/or wake control register 311 may be decoded and then propagated through the multiplexers 304 and 306 to control whether the firewall power control is on or off. Moreover, once the firewall power control bit is set to "1," the assert firewall enable 305 may be sequenced by the power management component 115 and the information may be written to the hardware isolation power control register 315.

Figure 3B:
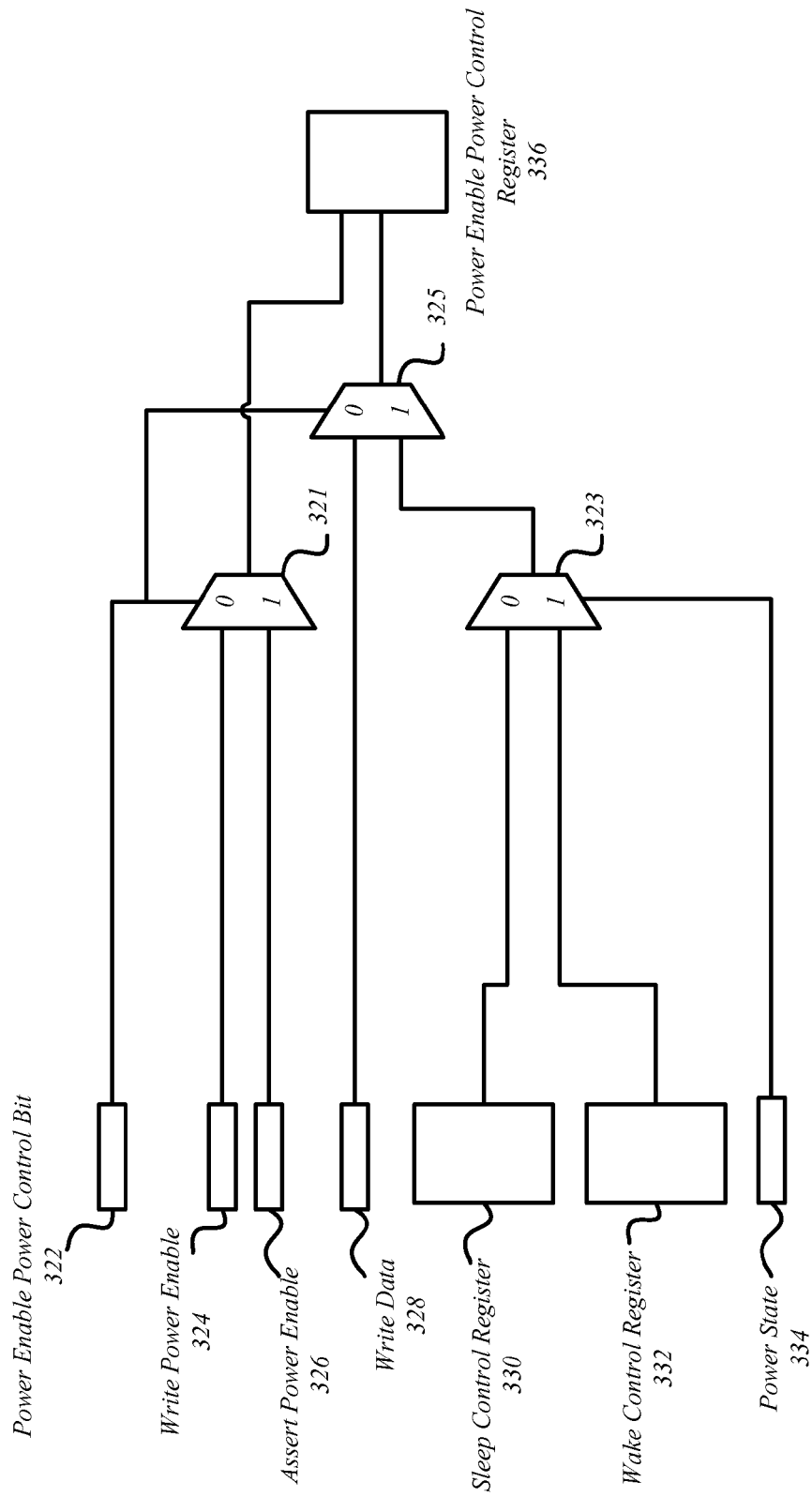
FIG. 3B illustrates an embodiment of a second logic path for power enable.

FIG. 3B illustrates an embodiment of a second logic path 320 for configuring the power enable power control and the power enable power control register for a subsystem. Each of the subsystems may have similar or the same logic control path to configure the power enable power control. Various embodiments are not limited to this exemplary embodiment and other logic control paths may be utilized to configure a power enable power control and set a power enable power control register.

The logic control path 320 may include a number of input lines including the power enable power control 322, the write power enable 324, the assert power enable 326, the write data 328 and the power state 334. In addition, the logic control 320 may include a number of registers such as sleep control register 330, wake control register 332 and power enable power control register 336. Finally, the logic control may include multiplexers 321, 323 and 325 to act as a switch based on one or more of the inputs on the input lines.

In various embodiments, the power enable power control bit(s) 322 may be the control bit(s) in the power management power control register 164 associated with the power enable power control for the subsystems. The power enable power control bit 322 may be the master control bit determining when the information or setting in sleep control register 330 or the wake control register 332 is set in the power enable power control register 336. The power enable power control bit(s) 322 may be asserted or enabled when the power management component 115 writes to the control bit(s) in the power management power control register 164 to configure each power enable power control and set the power enable power control register 336 for each subsystem in parallel.

In various embodiments, the write power enable 324 and write data 328 are override mechanisms that may be utilized when the power enable power control bit 322 is not enable or set to 0. The write power enable 324 and the write data 328 may be used to isolate any single subsystem for configuration. When the power enable power control bit 322 is set to 0 or not enabled the write power enable 324 is the enable for the hardware power enable power control register 336 and the write data 328 is the information to write to power enable power control register 336. The write power enable 324 and write 328 are utilized power management component 115 to set the power enable power control register 336 for a single subsystem and not when the subsystems are being set in parallel Further, the sleep control register 330 and wake control register 332 may be the same as similar to sleep control registers 160 and wake control registers 162, respectively. The power state 334 may be set to select between the sleep control register 330 and the wake control register 332. For example, if the platform processing device is not in a low power state, the power state 334 may be set to select the sleep control register 330 to act as a qualifier when the subsystem enters into the low power state. However, if the platform processing device is in a low power state, the power state 334 may be set to select the wake control register 332 to use when the subsystem exits the low power state.

As previously discussed, the sleep control register 330 and wake control register 332 may act as a qualifier and may be used to configure the power enable power control register 336 with the appropriate state for the power enable power control. The information in the sleep control register 330 and/or wake control register 332 may be decoded and then propagated through the multiplexers 323 and 325 to control whether the power enable power control is on or off. Moreover, once the power enable power control bit 322 is set to "1," the assert power enable 326 may be sequenced by the power management component 115 and the information may be written to the power enable power control register 336.

Figure 3C:
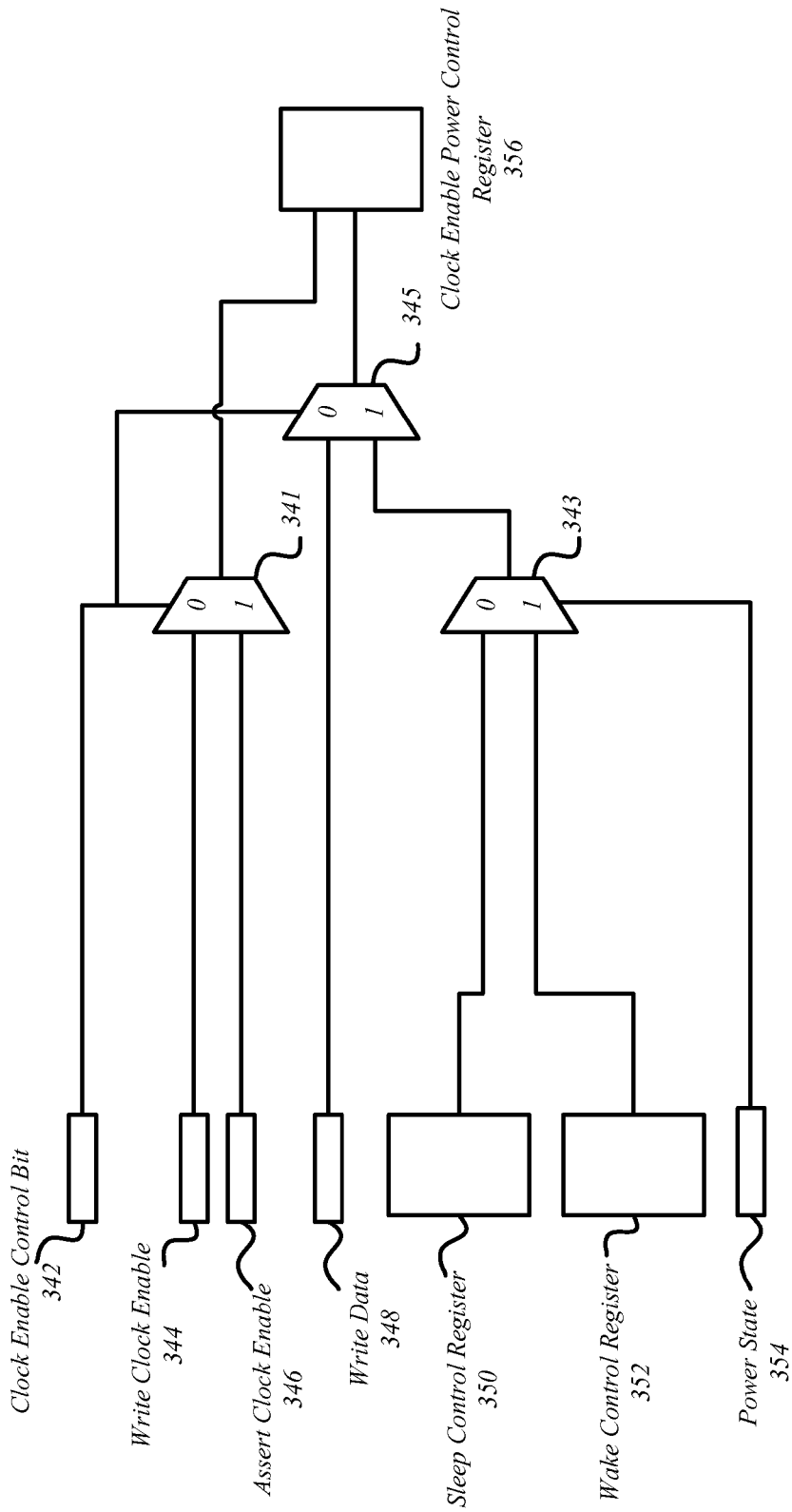
FIG. 3C illustrates an embodiment of a third logic path for clock enable.

FIG. 3C illustrates an embodiment of a third logic path 340 for configuring the clock enable power control and the clock enable power control register for a subsystem. Each of the subsystems may have similar or the same logic control path to configure the clock enable power control. Various embodiments are not limited to this exemplary embodiment and other logic control paths may be utilized to configure a clock enable power control and set a clock enable power control register.

The logic control path 340 may include a number of input lines including the clock enable power control 342, the write clock enable 344, the assert clock enable 346, the write data 348 and the power state 354. In addition, the logic control 340 may include a number of registers such as sleep control register 350, wake control register 352 and clock enable power control register 356. Finally, the logic control may include multiplexers 341, 343 and 345 to act as a switch based on one or more of the inputs on the input lines.

In various embodiments, the clock enable power control bit(s) 342 may be the control bit(s) in the power management power control register 164 associated with the clock enable power control for the subsystems. The clock enable power control bit 342 may be the master control bit determining when the information or setting in sleep control register 350 or the wake control register 352 is set in the clock enable power control register 356. The clock enable power control bit(s) 342 may be asserted or enabled when the power management component 115 writes to the control bit(s) in the power management power control register 164 to configure each clock enable power control and set the clock enable power control register 356 for each subsystem in parallel.

In various embodiments, the write clock enable 344 and write data 348 are override mechanisms that may be utilized when the clock enable power control bit 342 is not enable or set to 0. The write clock enable 344 and the write data 348 may be used to isolate any single subsystem for configuration. When the clock enable power control bit 342 is set to 0 or not enabled, the write clock enable 344 is the enable for the hardware clock enable power control register 356 and the write data 348 is the information to write to clock enable power control register 356. These bits, the write reset 344 and write data 348 are utilized power management component 115 to set the clock enable power control register 356 for a single subsystem and not when the subsystems are being set in parallel.

Further, the sleep control register 350 and wake control register 352 may be the same as similar to sleep control registers 160 and wake control registers 162, respectively. The power state 354 may be set to select between the sleep control register 350 and the wake control register 352. For example, if the platform processing device is not in a low power state, the power state 354 may be set to select the sleep control register 350 to act as a qualifier when the subsystem enters into the low power state. However, if the platform processing device is in a low power state, the power state 354 may be set to select the wake control register 352 to use when the subsystem exits the low power state.

As previously discussed, the sleep control register 350 and wake control register 352 may act as a qualifier and may be used to configure the clock enable power control register 356 with the appropriate state for the clock enable power control. The information in the sleep control register 350 and/or wake control register 352 may be decoded and then propagated through the multiplexers 343 and 345 to control whether the clock enable power control is on or off. Moreover, once the clock enable control bit 342 is set to "1," the assert clock enable 346 may be sequenced by the power management component 115 and the information may be written to the clock enable power control register 356.

Figure 3D:
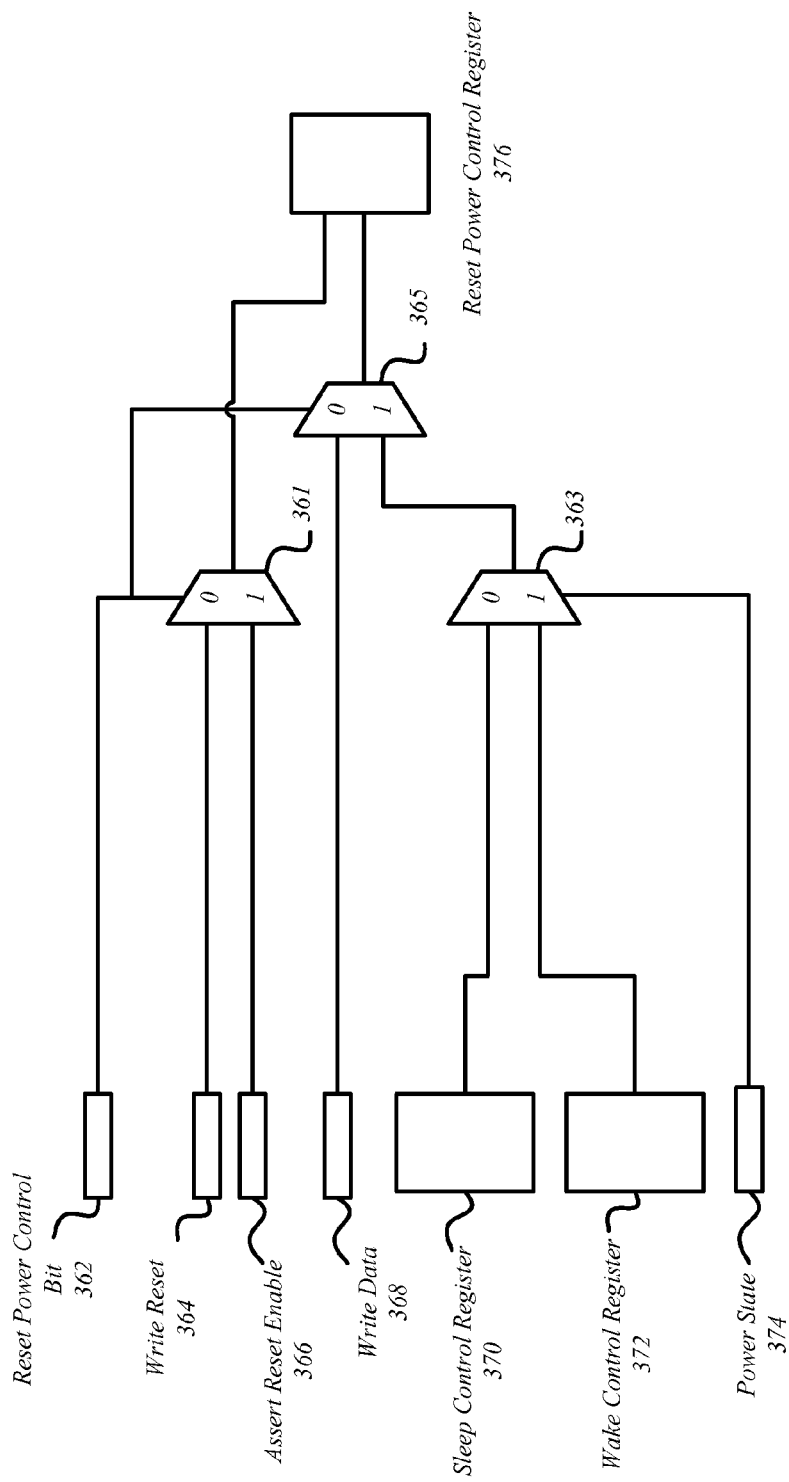
FIG. 3D illustrates an embodiment of a fourth logic path for reset.

FIG. 3D illustrates an embodiment of a fourth logic path 360 for configuring the reset power control and the reset power control register for a subsystem. Each of the subsystems may have similar or the same logic control path to configure the reset power control. Various embodiments are not limited to this exemplary embodiment and other logic control paths may be utilized to configure a reset power control and set a reset power control register.

The logic control path 360 may include a number of input lines including the reset power control 362, the write reset enable 364, the assert reset enable 366, the write data 368 and the power state 374. In addition, the logic control 360 may include a number of registers such as sleep control register 370, wake control register 372 and reset power control register 376. Finally, the logic control may include multiplexers 361, 363 and 365 to act as a switch based on one or more of the inputs on the input lines.

In various embodiments, the reset power control bit(s) 362 may be the control bit(s) in the power management power control register 164 associated with the reset power control for the subsystems. The reset power control bit 362 may be the master control bit determining when the information or setting in sleep control register 370 or the wake control register 372 is set in the reset power control register 376. The reset power control bit(s) 362 may be asserted or enabled when the power management component 115 writes to the control bit(s) in the power management power control register 164 to configure each reset power control and set the reset power control register 376 for each subsystem in parallel.

In various embodiments, the write reset 364 and write data 368 are override mechanisms that may be utilized when the firewall power control bit 301 is not enable or set to 0. The write reset 364 may be used to isolate any single subsystem for configuration. When the reset power control bit 362 is set to 0 or not enabled, the write reset 364 is the enable for the reset power control register 376 and the write data 368 is the information to write to reset power control register 376. These bits, the write reset 364 and write 368 are utilized power management component 115 to set the reset power control register 376 for a single subsystem and not when the subsystems are being set in parallel.

Further, the sleep control register 370 and wake control register 372 may be the same as similar to sleep control registers 160 and wake control registers 162, respectively. The power state 374 may be set to select between the sleep control register 370 and the wake control register 372. For example, if the platform processing device is not in a low power state, the power state 374 may be set to select the sleep control register 370 to act as a qualifier when the subsystem enters into the low power state. However, if the platform processing device is in a low power state, the power state 374 may be set to select the wake control register 372 to use when the subsystem exits the low power state.

As previously discussed, the sleep control register 370 and wake control register 372 may act as a qualifier and may be used to configure the reset power control register 376 with the appropriate state for the reset power control. The information in the sleep control register 370 and/or wake control register 372 may be decoded and then propagated through the multiplexers 363 and 365 to control whether the reset power control is on or off. Moreover, once the reset power control bit 362 is set to "1," the assert reset enable 366 may be sequenced by the power management component 115 and the information may be written to the reset power control register 376.

FIG. 4 illustrates one embodiment of a third logic flow 400. The logic flow 400 may be representative of some or all of the operations executed by one or more embodiments described herein. For example, the logic flow 400 may illustrate operations performed by the system 100 and, more particularly, computer system 105 and platform processing device 110 of system 100. In the illustrated embodiment shown in FIG. 4, the logic flow 400 may include determining a sleep configuration state for each of a plurality of subsystems having an associated subsystem sleep control register for entry into a low or lower power state at block 402. In various embodiments, the sleep configuration states may be determined for each of the subsystems 111 based on a configuration file such as a MIP header file. The configuration file may have a logical to physical mapping table to map the logical subsystem to the physical subsystem. In various embodiments, the power management component 115 may determine the sleep configuration states at boot up time of the platform processing device 110 or after the platform processing device 110 has already completely booted up by looking up the configuration information in the configuration file.

In various embodiments, logic flow 400 may also include configuring each of the associated subsystem sleep control registers with the sleep configuration state for each of the subsystems at block 404. For example, the power management component 115 may load or set each of the sleep control registers 160 with the configuration information corresponding to each subsystem. The configuration information may be loaded into or set in the sleep control registers 160 prior the platform processing device 110 entering the lower power state.

The logic flow 400 may also include enabling the sleep configuration state for each of the subsystems in parallel when transitioning to the low or lower power state. For example, the power management component 115 may set one or more bit(s) in the power management power control register 164 corresponding to each of the power controls, including the firewall enable power control, the power enable power control, the clock enable power control and reset power control. When the power management component 115 sets the one or more bit(s) corresponding to a power control, the power control configuration is propagated to each of the subsystems in parallel.

In various embodiments, the power manage component 115 may set one or more bit(s) for each of the power controls with a delay between each of the power control configuration to ensure that each subsystems corresponding power control register is properly configured. For example, the power management component 115 may set the one or more bit(s) for the firewall enable power control, the firewall enable power control may then be set or configured for each of the subsystems in parallel, and the power management component may wait a time period or a delay to set one or more bit(s) corresponding to another power control. After the delay, the power management component 115 may set one or more bit(s) corresponding to a different power control, such as the clock enable power control, and the clock enable power control may be configured for each of the subsystems in parallel. This process may be repeated until all of the power controls are set or configured for each of the subsystems.

Figure 5:
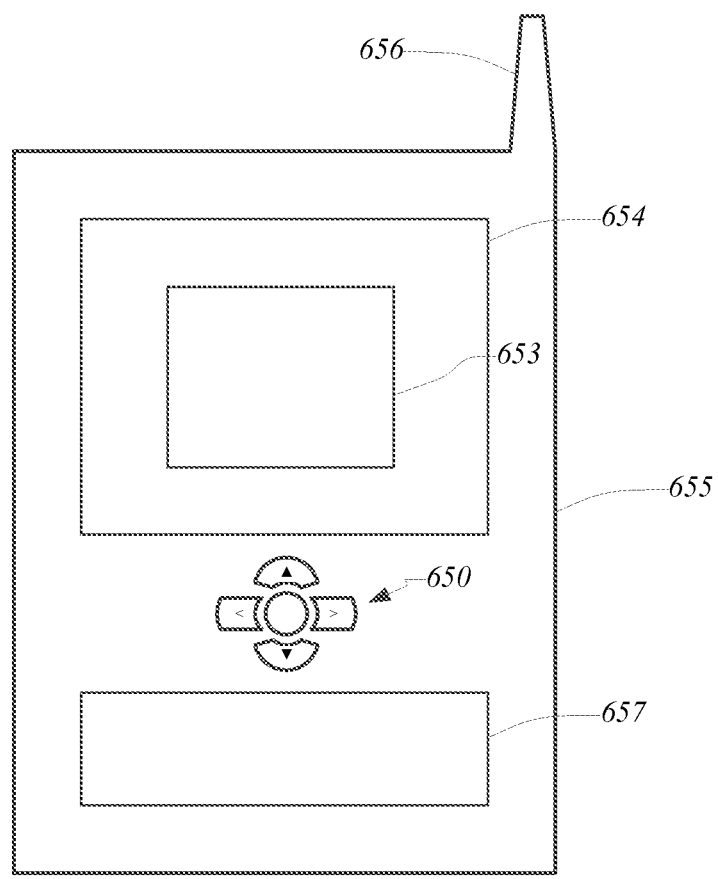
FIG. 5 illustrates an embodiment of a computing device.

FIG. 5 illustrates embodiments of a computing device 500 in which system 100 may be embodied. In embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 500 may include a display 554, a navigation controller 550, a user interface 553, a housing 555, an I/O device 556, and an antenna 557. Display 554 may include any suitable display unit for displaying information appropriate for a mobile computing device. Navigation controller 550 may include one or more navigation features which may be used to interact with user interface 553. I/O device 556 may include any suitable I/O device for entering information into a mobile computing device. Examples for I/O device 556 may include an alphanumeric keyboard, a numeric keypad, a touch pad, input keys, buttons, switches, rocker switches, microphones, speakers, voice recognition device and software, and so forth. Information also may be entered into device 500 by way of microphone. Such information may be digitized by a voice recognition device. The embodiments are not limited in this context.

Figure 6:
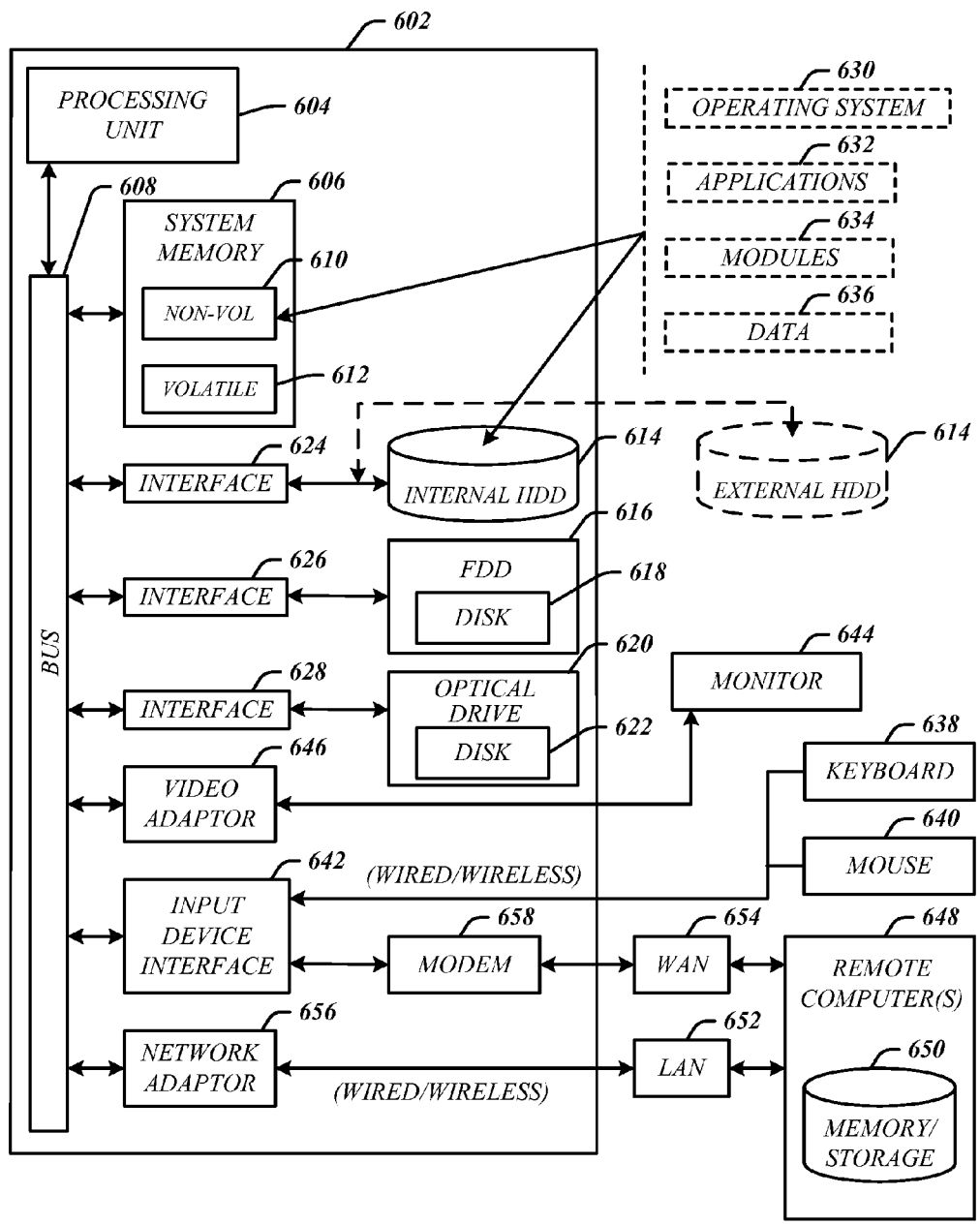
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may comprise or be implemented as part of or computing device 115.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, such as those described with reference to the platform processing device 110 shown in FIG. 1.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 105.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 105 as previously described with reference to FIGS. 1-6 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-eight (1-38) provided below are intended to be exemplary and non-limiting.

In a first example, an apparatus may include processor circuitry and a power management component, a controller or logic for execution on the processor circuitry to determine a sleep configuration state for each of a plurality of subsystems of the apparatus having an associated subsystem sleep control register for entry into a lower power state, configure each of the associated subsystem sleep control registers with the sleep configuration state for each of the subsystems and enable the sleep configuration state for each of the subsystems in parallel when transitioning to the lower power state.

In a second example and in furtherance of the first example, an apparatus may include a power management component or logic to determine which of the plurality of subsystems to disable and which of the subsystems to keep enabled when the apparatus is in the lower power state based on the sleep configuration state in the associated subsystem sleep control register.

In a third example and in furtherance of any of the previous examples, an apparatus may include subsystems associated with one or more power control registers and a power management component, a controller, or logic to configure each of the one or more power control registers when transitioning to the lower power state based on the sleep configuration state.

In a fourth example and in furtherance of any of the previous examples, an apparatus may include one or more power control registers comprising at least one of a firewall enable power control register, a power enable power control register, a clock enable power control register and a reset power control register.

In a fifth example and in furtherance of any of the previous examples, an apparatus may include a power management component, a controller, or logic to write a control bit for each of the one or more power control registers in a power management power control register to configure each of the one or more power control registers in a particular order, wherein the particular order is based on the order in which the control bits are written.

In a sixth example and in furtherance of any of the previous examples, an apparatus may include a power management component, a controller, or logic to configure a same register of the one or more power control registers for each of the subsystems in parallel by writing a control bit for each of the one or more power control registers in a power management power control register.

In a seventh example and in furtherance of any of the previous examples, an apparatus may include a power management component, a controller or logic to determine a wake configuration state for each of the plurality of subsystems having an associated subsystem wake control register for exiting a lower power state, configure each of the associated subsystem wake control registers with the wake configuration state for each of the subsystems and enable the wake configuration state for each of the subsystems in parallel when transitioning from the lower power state.

In an eighth example and in furtherance of any of the previous examples, an apparatus may include wherein each of the subsystems is associated with one or more power control registers and a power management component, a controller or logic to configure each of the one or more power control registers when transitioning from the low power state is based on the wake configuration state.

In a ninth example and in furtherance of any of the previous examples, an article comprising a computer-readable storage medium containing a plurality of instructions that when executed enable a processor circuit to determine a sleep configuration state for each of a plurality of subsystems having an associated subsystem sleep control register for entry into a lower power state, configure each of the associated subsystem sleep control registers with the sleep configuration state for each of the subsystems and enable the sleep configuration state for each of the subsystems in parallel when transitioning to the lower power state.

In a tenth example and in furtherance of any of the previous examples, an article comprising a computer-readable storage medium containing a plurality of instructions that when executed enable a processor circuit to determine which of the plurality of subsystems to disable and which of the subsystems to keep enabled based on the sleep configuration state in the associated subsystem sleep control register.

In an eleventh example and in furtherance of any of the previous examples, wherein each of the subsystems is associated with one or more power control registers and the article comprising the computer-readable storage medium containing the plurality of instruction that when executed enable the processor circuit to configure each of the one or more power control registers when transitioning to the lower power state based on the sleep configuration state.

In a twelfth example and in furtherance of any of the previous examples, a the one or more power control registers comprising at least one of a firewall enable power control register, a power enable power control register, a clock enable power control register and a reset power control register.

In a thirteenth example and in furtherance of any of the previous examples, an article comprising a computer-readable storage medium containing a plurality of instructions that when executed enable a processor circuit to write a control bit for each of the one or more power control registers in a power management power control register to configure each of the one or more power control registers in a particular order, wherein the particular order is based on the order in which the control bits are written.

In a fourteenth example and in furtherance of any of the previous examples, an article comprising a computer-readable storage medium containing a plurality of instructions that when executed enable a processor circuit to configure a same register type of the one or more power control registers for each of the subsystems in parallel by writing a control bit for each of the one or more power control registers in a power management power control register.

In a fifteenth example and in furtherance of any of the previous examples, an article comprising a computer-readable storage medium containing a plurality of instructions that when executed enable a processor circuit to determine a wake configuration state for each of the plurality of subsystems having an associated subsystem wake control register for exiting a lower power state, configure each of the associated subsystem wake control registers with the wake configuration state for each of the subsystems and enable the wake configuration state for each of the subsystems in parallel when transitioning from the lower power state.

In a sixteenth example and in furtherance of any of the previous examples, an article comprising a computer-readable storage medium containing a plurality of instructions that when executed enable a processor circuit to wherein each of the subsystems is associated with one or more power control registers and the article comprising the computer-readable storage medium containing the plurality of instruction that when executed enable the processor circuit to configure each of the one or more power control registers when transitioning from the lower power state is based on the wake configuration state.

In a sixteenth example and in furtherance of any of the previous examples, wherein each of the subsystems is associated with one or more power control registers and the article comprising the computer-readable storage medium containing the plurality of instruction that when executed enable the processor circuit to configure each of the one or more power control registers when transitioning from the lower power state is based on the wake configuration state.

In a seventeenth example and in furtherance of any of the previous examples, a computer-implemented method may include determining a sleep configuration state for each of a plurality of subsystems having an associated subsystem sleep control register for entry into a lower power state, configuring each of the associated subsystem sleep control registers with the sleep configuration state for each of the subsystems and enabling the sleep configuration state for each of the subsystems in parallel when transitioning to the lower power state.

In an eighteenth example and in furtherance of any of the previous examples, a computer-implemented method may include determining which of the plurality of subsystems to disable and which of the subsystems to keep enabled based on the sleep configuration state in the associated subsystem sleep control register.

In a nineteenth example and in furtherance of any of the previous examples, wherein each of the subsystems is associated with one or more power control registers and a method may include configuring each of the one or more power control registers when transitioning to the lower power state based on the sleep configuration state.

In a twentieth example and in furtherance of any of the previous examples, a computer-implemented method may include the one or more power control registers comprising at least one of a firewall enable power control register, a power enable power control register, a clock enable power control register and a reset power control register.

In a twenty-first example and in furtherance of any of the previous examples, a computer-implemented method may include writing a control bit for each of the one or more power control registers in a power management power control register to configure each of the one or more power control registers in a particular order, wherein the particular order is based on the order in which the control bits are written.

In a twenty-second example and in furtherance of any of the previous examples, a computer-implemented method may include configuring a same register type of the one or more power control registers for each of the subsystems in parallel by writing a control bit for each of the one or more power control registers in a power management power control register.

In a twenty-third example and in furtherance of any of the previous examples, a computer-implemented method may include determining a wake configuration state for each of the plurality of subsystems having an associated subsystem wake control register for exiting a lower power state, configuring each of the associated subsystem wake control registers with the wake configuration state for each of the subsystems and enabling the wake configuration state for each of the subsystems in parallel when transitioning from the lower power state.

In a twenty-fourth example and in furtherance of any of the previous examples, a computer-implemented method may include wherein each of the subsystems is associated with one or more power control registers and the method comprising configuring each of the one or more power control registers when transitioning from the lower power state is based on the wake configuration state.

In a twenty-fifth example and in furtherance of any of the previous examples, an apparatus may include means for determining a sleep configuration state for each of a plurality of subsystems having an associated subsystem sleep control register for entry into a lower power state, means for configuring each of the associated subsystem sleep control registers with the sleep configuration state for each of the subsystems and means for enabling the sleep configuration state for each of the subsystems in parallel when transitioning to the lower power state.

In a twenty-sixth example and in furtherance of any of the previous examples, an apparatus may include means for determining which of the plurality of subsystems to disable and which of the subsystems to keep enabled based on the sleep configuration state in the associated subsystem sleep control register.

In a twenty-seventh example and in furtherance of any of the previous examples, wherein each of the subsystems is associated with one or more power control registers and an apparatus may include means for configuring each of the one or more power control registers when transitioning to the lower power state based on the sleep configuration state In a twenty-eighth example and in furtherance of any of the previous examples, the one or more power control registers comprising at least one of a firewall enable power control register, a power enable power control register, a clock enable power control register and a reset power control register.

In a twenty-ninth example and in furtherance of any of the previous examples, the apparatus may include means for writing a control bit for each of the one or more power control registers in a power management power control register to configure each of the one or more power control registers in a particular order, wherein the particular order is based on the order in which the control bits are written.

In a thirtieth example and in furtherance of any of the previous examples, an apparatus may include means for configuring a same register type of the one or more power control registers for each of the subsystems in parallel by writing a control bit for each of the one or more power control registers in a power management power control register.

In a thirty-first and in furtherance of any of the previous examples, an apparatus may include means for determining a wake configuration state for each of the plurality of subsystems having an associated subsystem wake control register for exiting a lower power state, means for configuring each of the associated subsystem wake control registers with the wake configuration state for each of the subsystems and means for enabling the wake configuration state for each of the subsystems in parallel when transitioning from the lower power state.

In a thirty-second example and in furtherance of any of the previous examples, wherein each of the subsystems is associated with one or more power control registers and an apparatus may include means for configuring each of the one or more power control registers when transitioning from the lower power state is based on the wake configuration state.

In a thirty-third example and in furtherance of any of the previous examples, a computing device to transition to a lower power state may include processor circuitry; and a power management component for execution on the processor circuitry to determine a sleep configuration state for each of a plurality of subsystems of a device having an associated subsystem sleep control register for entry into the lower power state, configure each of the associated subsystem sleep control registers with the sleep configuration state for each of the subsystems, and enable the sleep configuration state for each of the subsystems in parallel when transitioning to the lower power state.

In a thirty-third example and in furtherance of any of the previous examples, a computing device may include a power management component to determine which of the plurality of subsystems to disable and which of the subsystems to keep enabled when the device is in the lower power state based on the sleep configuration state in the associated subsystem sleep control register.

In a thirty-fourth example and in furtherance of any of the previous examples, wherein each of the subsystems is associated with one or more power control registers and a computing device including a power management component to configure each of the one or more power control registers when transitioning to the lower power state based on the sleep configuration state.

In a thirty-fifth example and in furtherance of any of the previous examples, the one or more power control registers comprising at least one of a firewall enable power control register, a power enable power control register, a clock enable power control register and a reset power control register.

In a thirty-sixth example and in furtherance of any of the previous examples, the computing device may include a power management component to write a control bit for each of the one or more power control registers in a power management power control register to configure each of the one or more power control registers in a particular order, wherein the particular order is based on the order in which the control bits are written.

In a thirty-seventh example and in furtherance of any of the previous examples, the computing device may include a power management component to configure a same register type of the one or more power control registers for each of the subsystems in parallel by writing a control bit for each of the one or more power control registers in a power management power control register.

In a thirty-seventh example and in furtherance of any of the previous examples, a computing device may include a power management component to determine a wake configuration state for each of the plurality of subsystems having an associated subsystem wake control register for exiting a lower power state, configure each of the associated subsystem wake control registers with the wake configuration state for each of the subsystems and enable the wake configuration state for each of the subsystems in parallel when transitioning from the lower power state.

In a thirty-eighth and in furtherance of any of the previous examples, wherein each of the subsystems is associated with one or more power control registers and a computing device may include a power management component to configure each of the one or more power control registers when transitioning from the lower power state is based on the wake configuration state.

In a thirty-ninth example and in furtherance of any of the previous examples, an computing system to transition to a lower power state, may include a memory, an input/output component, a display, processor circuitry and a power management component for execution on the processor circuitry to determine a sleep configuration state for each of a plurality of subsystems of a device having an associated subsystem sleep control register for entry into the lower power state, configure each of the associated subsystem sleep control registers with the sleep configuration state for each of the subsystems, and enable the sleep configuration state for each of the subsystems in parallel when transitioning to the lower power state.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
processor circuitry; and
a power management component for execution on the processor circuitry, the power management component to:
  determine a sleep configuration state for each of a plurality of subsystems of a device having an associated subsystem sleep control register for entry into a lower power state,
  configure each of the associated subsystem sleep control registers with the sleep configuration state for each of the subsystems,
  enable the sleep configuration state for each of the subsystems in parallel when transitioning to the lower power state, and
  write a control bit for each of a plurality of power control registers in a power management power control register to configure each of the plurality of power control registers in a particular order, wherein each of the plurality of subsystems is associated with a one of the plurality of power control registers and wherein the particular order is based on the order in which the control bits are written.

2. The apparatus of claim 1, the power management component to determine which of the plurality of subsystems to disable and which of the subsystems to keep enabled when the device is in the lower power state based on the sleep configuration state in the associated subsystem sleep control register.

3. The apparatus of claim 1, the plurality of power control registers comprising at least one of a firewall enable power control register, a power enable power control register, a clock enable power control register and a reset power control register.

4. The apparatus of claim 1, the power management component to configure a same register type of the plurality of power control registers for each of the subsystems in parallel by writing a control bit for each of the plurality of power control registers in a power management power control register.

5. The apparatus of claim 1, the power management component to determine a wake configuration state for each of the plurality of subsystems having an associated subsystem wake control register for exiting a lower power state, configure each of the associated subsystem wake control registers with the wake configuration state for each of the subsystems and enable the wake configuration state for each of the subsystems in parallel when transitioning from the lower power state.

6. The apparatus of claim 5, wherein each of the subsystems is associated with one or more power control registers and the power management component to configure each of the one or more power control registers when transitioning from the lower power state is based on the wake configuration state.

7. An article comprising a non-transitory computer-readable storage medium containing a plurality of instructions that when executed enable a processor circuit to:
- determine a sleep configuration state for each of a plurality of subsystems having an associated subsystem sleep control register for entry into a lower power state;
- configure each of the associated subsystem sleep control registers with the sleep configuration state for each of the subsystems;
- enable the sleep configuration state for each of the subsystems in parallel when transitioning to the lower power state; and,
- write a control bit for each of a plurality of power control registers in a power management power control register to configure each of the plurality of power control registers in a particular order, wherein each of the plurality of subsystems is associated with a one of the plurality of power control registers and wherein the particular order is based on the order in which the control bits are written.

8. The article of claim 7, comprising the non-transitory computer-readable storage medium containing the plurality of instruction that when executed enable the processor circuit to determine which of the plurality of subsystems to disable and which of the subsystems to keep enabled based on the sleep configuration state in the associated subsystem sleep control register.

9. The article of claim 7, the plurality of power control registers comprising at least one of a firewall enable power control register, a power enable power control register, a clock enable power control register and a reset power control register.

10. The article of claim 7, comprising the non-transitory computer-readable storage medium containing the plurality of instruction that when executed enable the processor circuit to configure a same register type of the plurality of power control registers for each of the subsystems in parallel by writing a control bit for each of the plurality of power control registers in a power management power control register.

11. The article of claim 7, comprising the non-transitory computer-readable storage medium containing the plurality of instruction that when executed enable the processor circuit to:
- determine a wake configuration state for each of the plurality of subsystems having an associated subsystem wake control register for exiting a lower power state;
- configure each of the associated subsystem wake control registers with the wake configuration state for each of the subsystems; and
- enable the wake configuration state for each of the subsystems in parallel when transitioning from the lower power state.

12. The article of claim 11, wherein each of the subsystems is associated with one or more power control registers and the article comprising the computer-readable storage medium containing the plurality of instruction that when executed enable the processor circuit to configure each of the one or more power control registers when transitioning from the lower power state is based on the wake configuration state.

13. An apparatus, comprising: processing logic to determine a sleep configuration state for each of a plurality of subsystems of a device having an associated subsystem sleep control register for entry into a lower power state, configure each of the associated subsystem sleep control registers with the sleep configuration state for each of the subsystems, enable the sleep configuration state for each of the subsystems in parallel when transitioning to the lower power state, and write a control bit for each of a plurality of power control registers in a power management power control register to configure each of the plurality of power control registers in a particular order, wherein each of the plurality of subsystems is associated with a one of the plurality of power control registers and wherein the particular order is based on the order in which the control bits are written.

14. The apparatus of claim 13, the processing logic to determine which of the plurality of subsystems to disable and which of the subsystems to keep enabled when the device is in the lower power state based on the sleep configuration state in the associated subsystem sleep control register.

15. The apparatus of claim 13, the plurality of power control registers comprising at least one of a firewall enable power control register, a power enable power control register, a clock enable power control register and a reset power control register.

16. The apparatus of claim 13, the processing logic to configure a same register type of the plurality of power control registers for each of the subsystems in parallel by writing a control bit for each of the plurality of power control registers in a power management power control register.

17. The apparatus of claim 13, the processing logic to determine a wake configuration state for each of the plurality of subsystems having an associated subsystem wake control register for exiting a lower power state, configure each of the associated subsystem wake control registers with the wake configuration state for each of the subsystems and enable the wake configuration state for each of the subsystems in parallel when transitioning from the lower power state.

* * * * *